Feb. 19, 1929.  
G. C. WHITE  
SCOOP  
Filed April 27, 1928
1,703,023
2 Sheets-Sheet 1
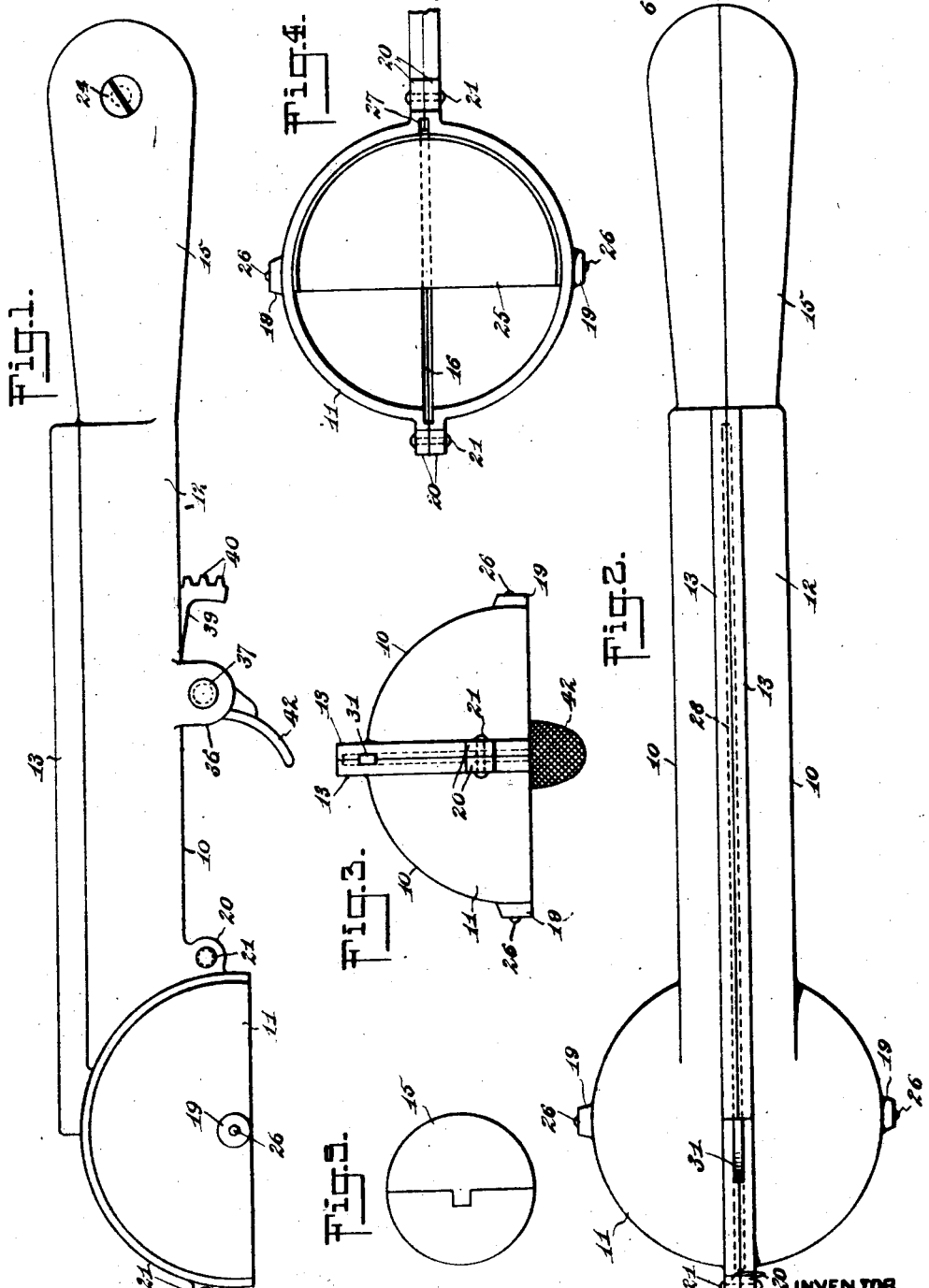
WITNESSES  
William P. Goebel  
Chris Feinle
INVENTOR  
George C. White.  
BY  
ATTORNEY Feb. 19, 1929.
G. C. WHITE
SCOOP
Filed April 27, 1928  2 Sheets-Sheet 2
1,703,023
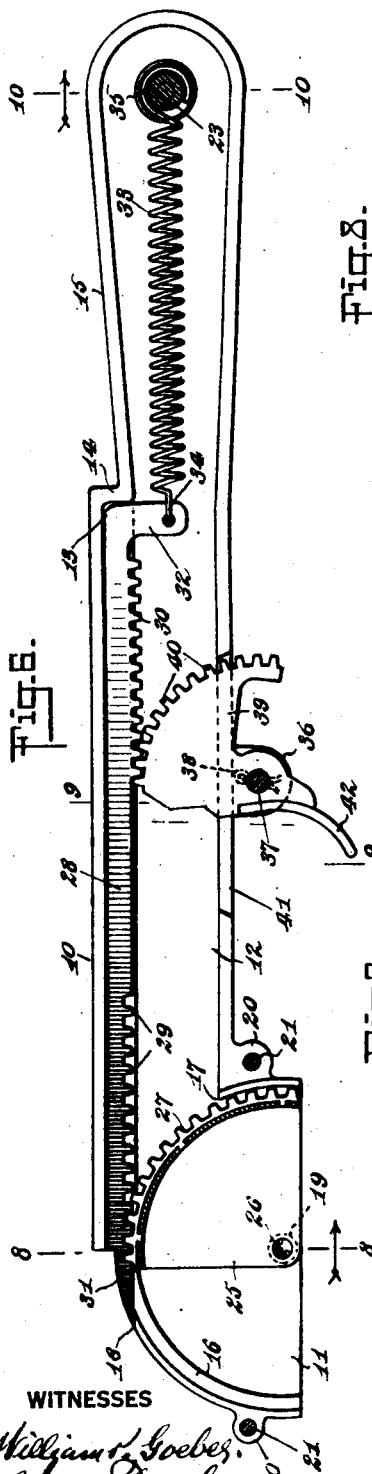
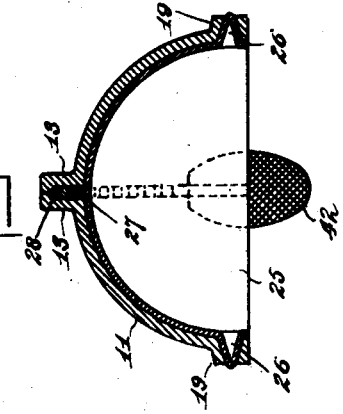
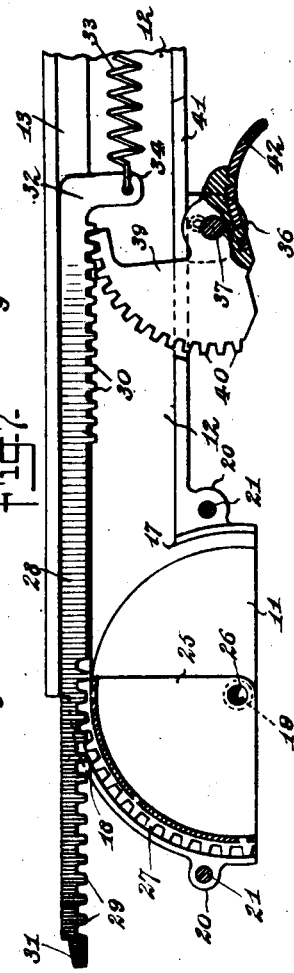
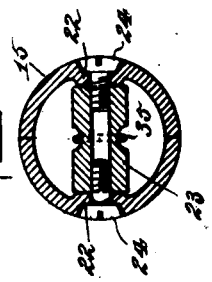
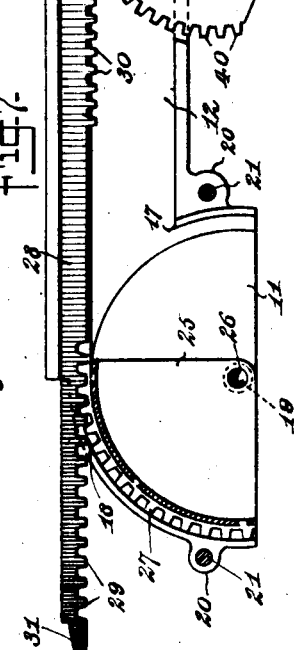
WITNESSES
INVENTOR
George C. White
BY
ATTORNEY Patented Feb. 19, 1929.

1,703,023

UNITED STATES PATENT OFFICE.

GEORGE C. WHITE, OF IRVINGTON, NEW JERSEY.

SCOOP.

Application filed April 27, 1928. Serial No. 273,387.

This invention relates to a scoop used for serving ice cream and other edible products, and for forming articles or fillers for confections.

One object of the invention is the provision of a scoop of the indicated character which will be of improved construction to the end that it may be manufactured with comparative economy; that it will not only serve for scooping materials, but will also be positive in action to eject the materials therefrom in formed quantities; and that it may be easily cleaned and therefore be kept in a sanitary condition.

With the foregoing and other objects in view, the invention resides in the particular provision, relative disposition and operation of the parts hereinafter described, and illustrated in the accompanying drawings, in which—

Figure 1, is a side elevation of the scoop.

Fig. 2, is a plan view.

Fig. 3, is an end view.

Fig. 4, is a view looking into the scoop body and showing the ejector.

Fig. 5, is an end view of the handle.

Fig. 6, is a central longitudinal sectional view taken on the line 6—6, of Fig. 2, showing the parts in a normal relationship.

Fig. 7, is a view similar to Fig. 6, a portion being broken away, the parts being shown in active relationship.

Fig. 8, is a transverse sectional view taken on the line 8—8, of Fig. 6.

Fig. 9, is a transverse sectional view taken on the line 9—9, of Fig. 6.

Fig. 10, is a transverse sectional view taken on the line 10—10, of Fig. 6.

Referring now more particularly to the drawings, it will be apparent, that the scoop includes two similar parts or sections 10, each of which is made of a single piece of sheet metal coated with porcelain, or vitreous material, and so formed that when the parts are brought together provide a substantially semispherical hollow body 11, and a handle 12, integral with the body 11, and extending laterally therefrom. The handle 12 is of hollow construction, and presents spaced longitudinal guide portions 13, portions 14 constituting a shoulder or stop, and a hand grip 15. The body 11 has a circumferential groove 16 in alignment with the space between the portions 13, an opening, as at 17, to the interior of the handle 12, and also an opening as at 18 through the top of the body 11. The body 11 has bearings 19 diametrically opposite each other in axial alignment, and each of said bearings 19 has a tapered hole. Each of the parts 10 has apertured lugs 20 which respectively accommodate rivets or other fastening elements 21. Each of the parts 10 also has sockets 22 located on the portions constituting the hand grip 15, and a spacer 23 is arranged between the sockets 22. Each of the sockets 22 has a hole for the reception of a suitable fastening element such as a headed screw 24 which threads into a bore in the spacer 23. The rivets 21 and screws 24 serve to hold the parts 10 together.

In order to eject the material, such as ice cream from the body 11, there is provided means presently to be described. A member 25 in the form of a quadrant of a sphere is arranged for movement in the body 11, circumferentially thereof, the said member 25 conforming to and fitting the interior surface of the body 11. The said member 25 is formed from a single piece of sheet metal and has integral tapered trunnions 26 arranged diametrically opposite each other in axial alignment. The said trunnions 26 respectively are received in the tapered holes in the bearings 19 heretofore mentioned. The member 25 is thus mounted for pivotal movement. The member 25 serves as an ejector and is movable from a normal position at one side of the body 11 as shown in Fig. 6 to the opposite side, as shown in Fig. 7. Arranged centrally of the member 25 and secured thereto in any suitable manner is a toothed rack 27, the teeth of which move in the groove 16. An element 28 is guided for movement in opposite directions between the guide portions 13. The element 28 at one end has teeth 29 which are adapted to mesh with the teeth of the rack 27, and also has a series of teeth 30 at the opposite end thereof. The extremity 31 of the element 28 adjacent the teeth 29 serves to close the opening 18 in the top of the body 11, when the element 28 is in the retracted position. The opposite end of the element 28 has an angular portion 32 adapted to engage the stop 14 to limit the movement of the element 28 to a position in which the extremity 31 will be in the opening 18, and in which the member 25 will be in a normal position to close the opening 17, this being the normal position of the member 25, as shown in Fig. 6. A spring 33 has one end thereof connected with the portion 32 as at 34, and the opposite end thereof is connected with the spacer 22, as at 35. The spring 33 serves to move the element 28 to its retracted position. The parts 10 are respectively provided with lugs 36 directly opposite each other, and the said lugs are provided respectively with holes for the accommodation of an arbor 37 which is held in place by split pins 38. A sector 39 having teeth 40 is arranged on the arbor 37 and moves through a slot 41 in the handle. The sector 39 has formed therewith or secured thereto a finger piece 42. The teeth 40 mesh with the teeth 30. The sector 39 together with the finger piece 42 constitute a trigger to impart movement to the element 28 by virtue of the coaction of the teeth 30 and 40.

From the foregoing it will be apparent that when the parts are in the normal relationship, as shown in Fig. 6, with the grip 15 of the device in one hand, a person may scoop a quantity of ice cream or other edible product with the body 11. Then by manipulating the finger piece 42 with the forefinger, forward movement will be imparted to the element 28, against the action of the spring 33, causing movement of the member 25, through the intervention of the teeth 29 and teeth of the rack 27, thereby ejecting a formed quantity of the contents held within the body 11. When pressure on the finger piece 42 is withdrawn, the spring 33 functions automatically to return the movable parts to their normal positions. It will be apparent that when the member 25 is moved to the ejecting position, as shown in Fig. 7, hot water may be admitted to the interior of the handle 12 for the purpose of cleaning the same whenever necessary or desirable.

I claim:

1. In a scoop of the class described, two parts, each part of integral construction and together said parts forming a hollow semispherical body and a handle extending latterally from the body, said body having axially aligned bearings respectively on opposite sides thereof, an ejector member in the form of a quadrant of the sphere, said ejector member having integral axial alined trunnions respectively on opposite sides thereof, said trunnions respectively being received in said bearings when said parts are brought together side by side, for the purpose of mounting said ejector member for pivotal movement, means serving to fasten said parts together, and means for operating the ejector member.

2. The invention as defined in claim 1, in which the semispherical body has a circumferential groove on the inside, and the means for operating the ejector member including a toothed rack on the ejector member, the teeth of said ejector member traversing said groove.

3. The invention as defined in claim 1, in which the handle is of hollow construction, the semispherical body having a circumferential groove opened to the interior of the handle, the means for operating the ejector member including a toothed arcuate rack on the ejector member the teeth of which traverse the groove, and an element guided for movement by portions of the handle, said element having teeth which mesh with the teeth of said rack.

Signed at New York in the county of New York and State of New York this 26th day of April A. D. 1928.

GEORGE C. WHITE.